US005898931A

United States Patent [19]

I'Anson et al.

[11] Patent Number: 5,898,931

[45] Date of Patent: Apr. 27, 1999

[54] BASE STATION FOR A TELECOMMUNICATIONS SYSTEM

[75] Inventors: Colin I'Anson, Frenchay, United Kingdom; Stuart Johnston, Lincoln, Calif.

[73] Assignee: Hewlett-Packard Company, Palo Alto, Calif.

[21] Appl. No.: 08/694,011

[22] Filed: Aug. 8, 1996

[30] Foreign Application Priority Data

Aug. 9, 1995 [EP] European Pat. Off. .............. 95305563

[51] Int. Cl.[6] ........................... H04B 7/15; H04L 12/403; H04L 12/56

[52] U.S. Cl. ............................................ 455/560; 455/561

[58] Field of Search .................................... 455/560, 561, 455/554, 555, 422, 426, 524

[56] References Cited

U.S. PATENT DOCUMENTS

| | | | |
|---|---|---|---|
| 5,305,467 | 4/1994 | Herndon et al. | 455/524 |
| 5,321,690 | 6/1994 | Sato | 455/561 |
| 5,475,681 | 12/1995 | White et al. | 370/60 |
| 5,592,480 | 1/1997 | Carney et al. | 455/561 |
| 5,625,623 | 4/1997 | Kent et al. | 455/560 |
| 5,659,597 | 8/1997 | Bareis et al. | 455/560 |
| 5,724,661 | 3/1998 | Nagashima | 455/561 |

FOREIGN PATENT DOCUMENTS

| | | |
|---|---|---|
| 0479477A3 | 9/1991 | European Pat. Off. . |
| 0647077A2 | 9/1994 | European Pat. Off. . |
| 9300044 U | 1/1993 | Germany . |

OTHER PUBLICATIONS

European Search Report 1, EP 95 30 5562, Jan. 12, 1996.
European Search Report 2, EP 95 30 5564, Jan. 11, 1996.
European Search Report 3, EP 95 30 5563, Jan. 11, 1996.

*Primary Examiner*—Reinhard J. Eisenzopf
*Assistant Examiner*—Edan Orgad

[57] ABSTRACT

In a mobile communications system each radio unit (14, 16) is associated with a respective base station (12) as its 'home' base station; any radio unit can communicate with any base station in whose service area it is located. Each base station has a radio interface (20) for communication with radio units, a telephone interface (24) for connection to a telephone line, for example via a PABX (44), and a LAN interface (28) for connection to a local area network (40) to which all the base stations are coupled. Voice communications for a handset are always routed through the home base station for that handset, e.g. to another handset or to the PABX, irrespective of the identity of the base station in whose service area the handset is currently located.

5 Claims, 12 Drawing Sheets

Fig.1
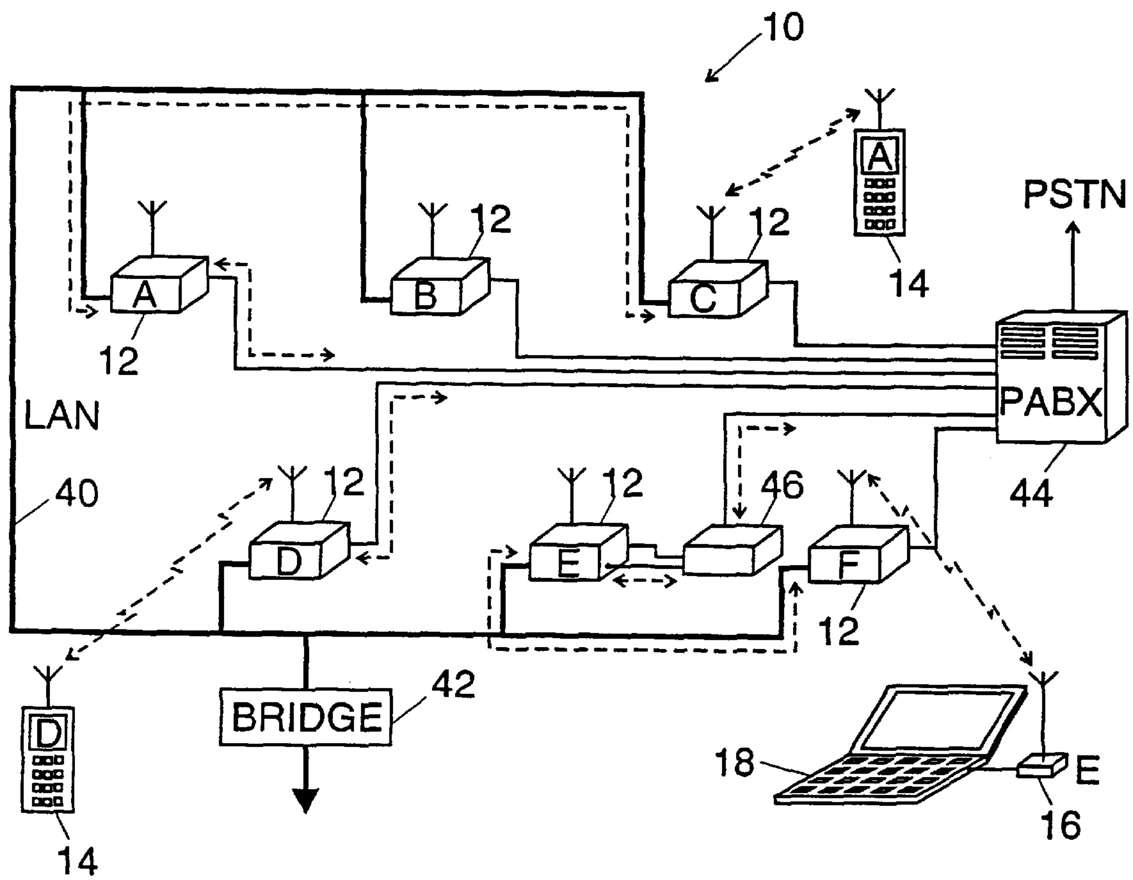
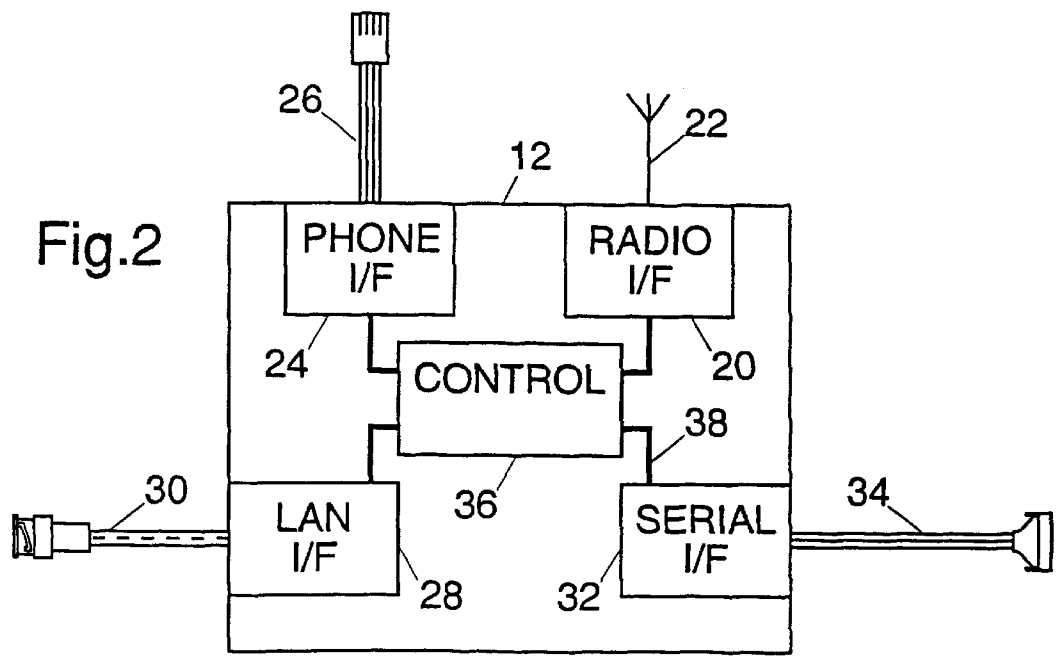
Fig.2

48
14
A
12D
54f
12C
C
D
44
PABX
PSTN
B
A
12B
50f
52
14
D
12A
40

52
14
D
12D
12C
54e
C
D
44
PABX
PSTN
B
A
48
14
A
12B
50e
12A
40

12D
12C
54h
C
D
44
PABX
PSTN
B
A
14
D
52
48
14
A
12B
50h
12A
40

12D
12C
54g
C
D
44
PABX
PSTN
B
A
12B
14
D
52
50g
48
14
A
12A
40

Fig.4
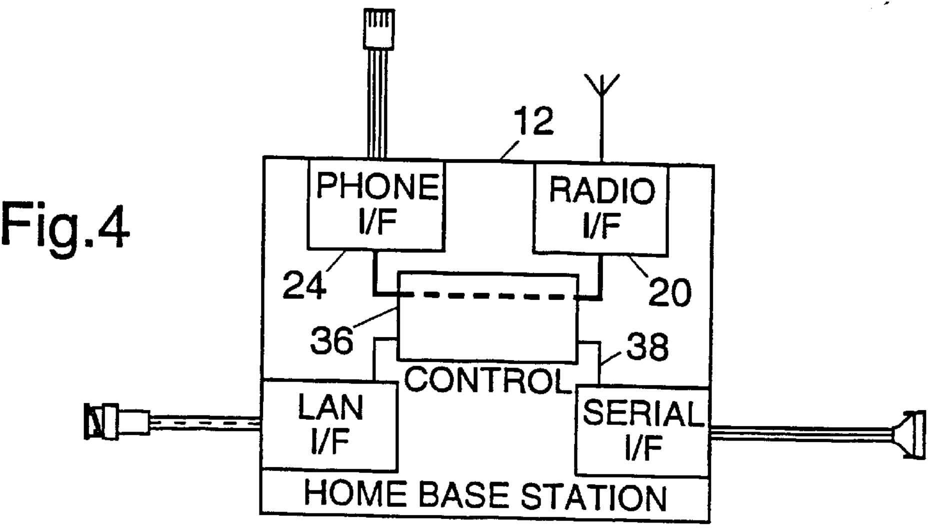
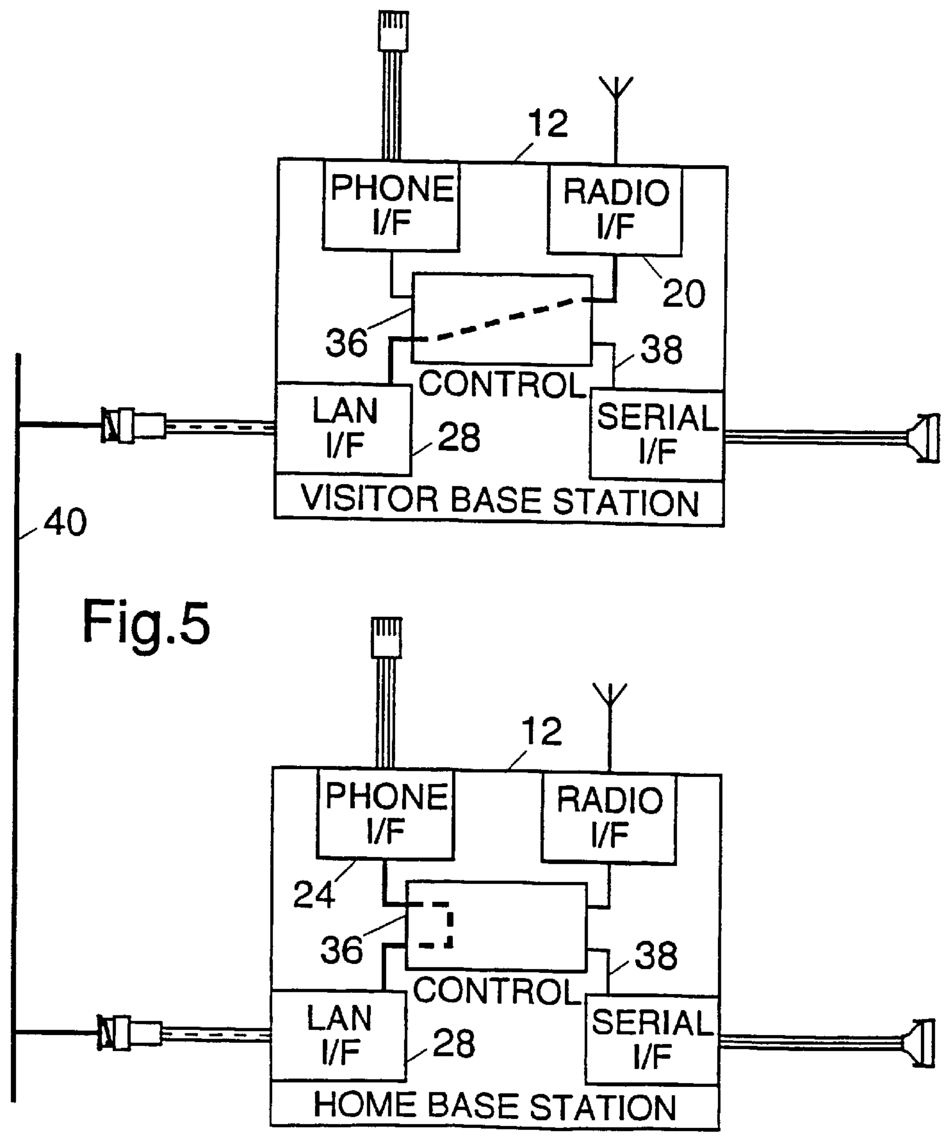
Fig.5

26
LINE I/F
90
92
D-A
DTMF
A-D
94
24
96
PHONE I/F
22
78
70
Tx
DECT Ctrl
Rx
80
74
Mod
Demod
82
72
Encode
Decode
84
20
RADIO I/F μP
MEMORY
60
62
SWITCH
64
38
CONTROL
36
102
30
LAN Tx/Rx
PAD
28
100
LAN I/F
110
UART
32
34
SERIAL I/F

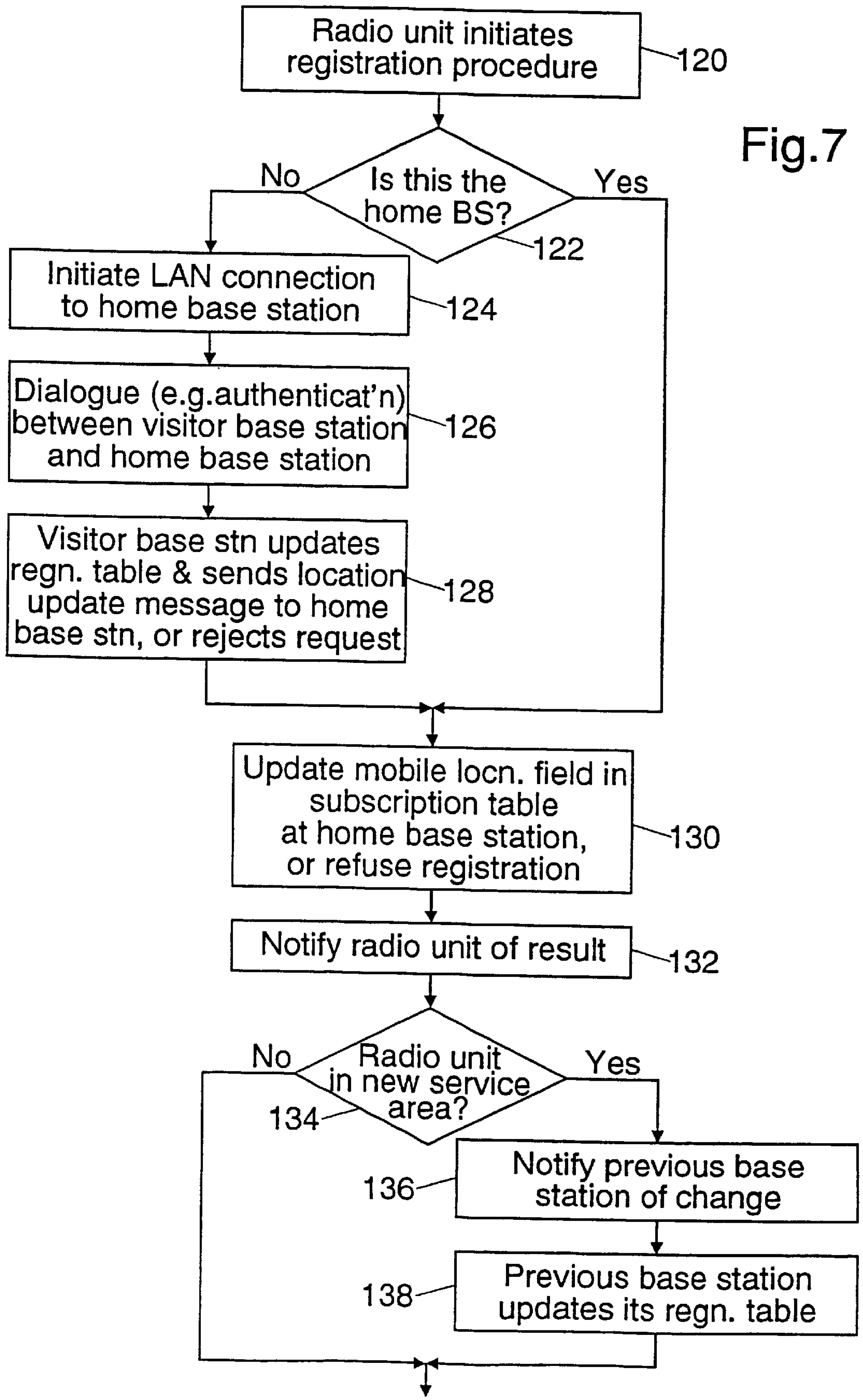
Radio unit initiates registration procedure
120
Fig.7
Is this the home BS?
No
Yes
122
Initiate LAN connection to home base station
124
Dialogue (e.g.authenticat'n) between visitor base station and home base station
126
Visitor base stn updates regn. table & sends location update message to home base stn, or rejects request
128
Update mobile locn. field in subscription table at home base station, or refuse registration
130
Notify radio unit of result
132
Radio unit in new service area?
No
Yes
134
Notify previous base station of change
136
Previous base station updates its regn. table
138

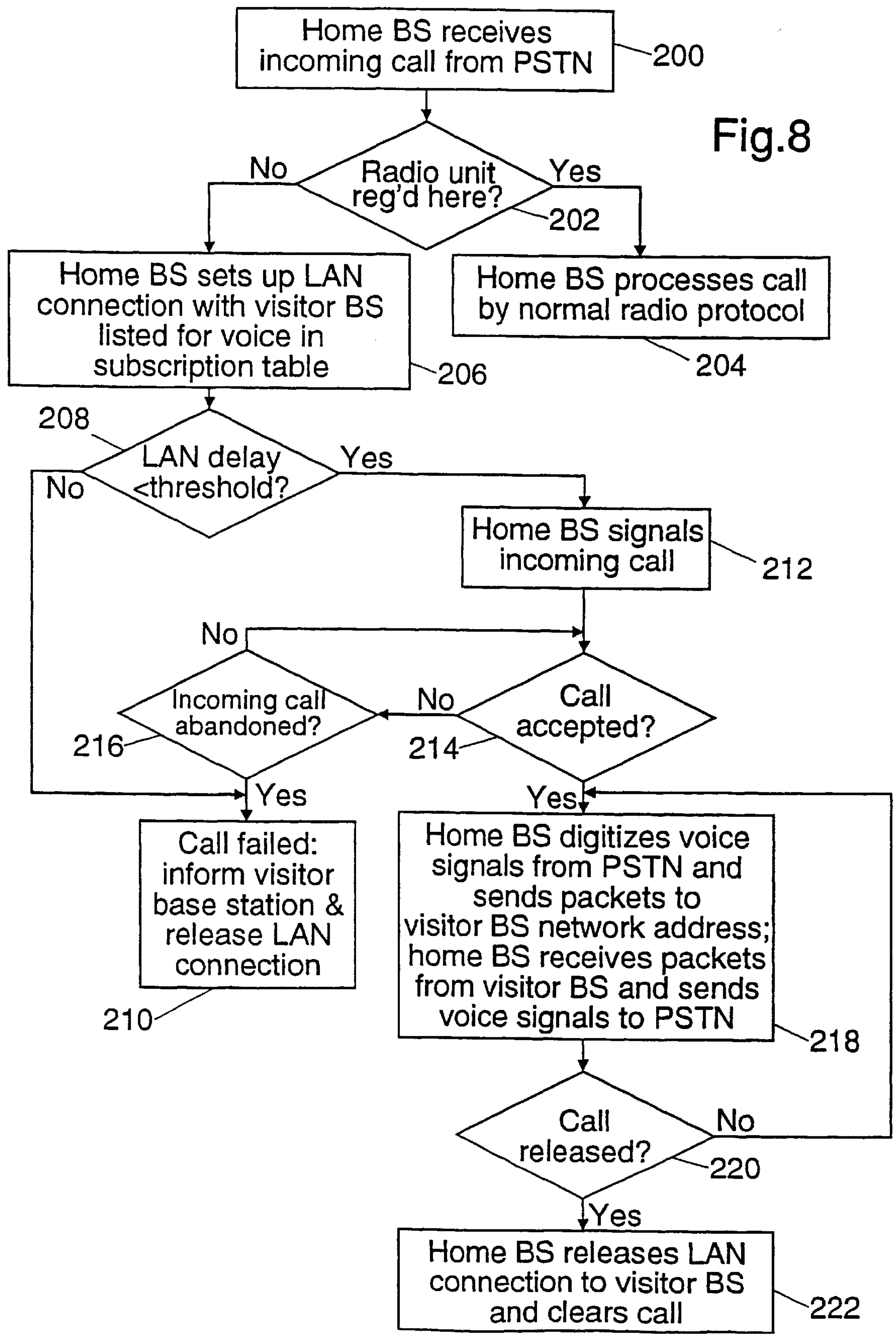
Home BS receives incoming call from PSTN
200
Fig.8
No
Radio unit reg'd here?
Yes
202
Home BS sets up LAN connection with visitor BS listed for voice in subscription table
Home BS processes call by normal radio protocol
206
204
208
LAN delay <threshold?
Yes
No
Home BS signals incoming call
212
No
Incoming call abandoned?
No
Call accepted?
216
214
Yes
Yes
Call failed: inform visitor base station & release LAN connection
Home BS digitizes voice signals from PSTN and sends packets to visitor BS network address; home BS receives packets from visitor BS and sends voice signals to PSTN
210
218
Call released?
No
220
Yes
Home BS releases LAN connection to visitor BS and clears call
222

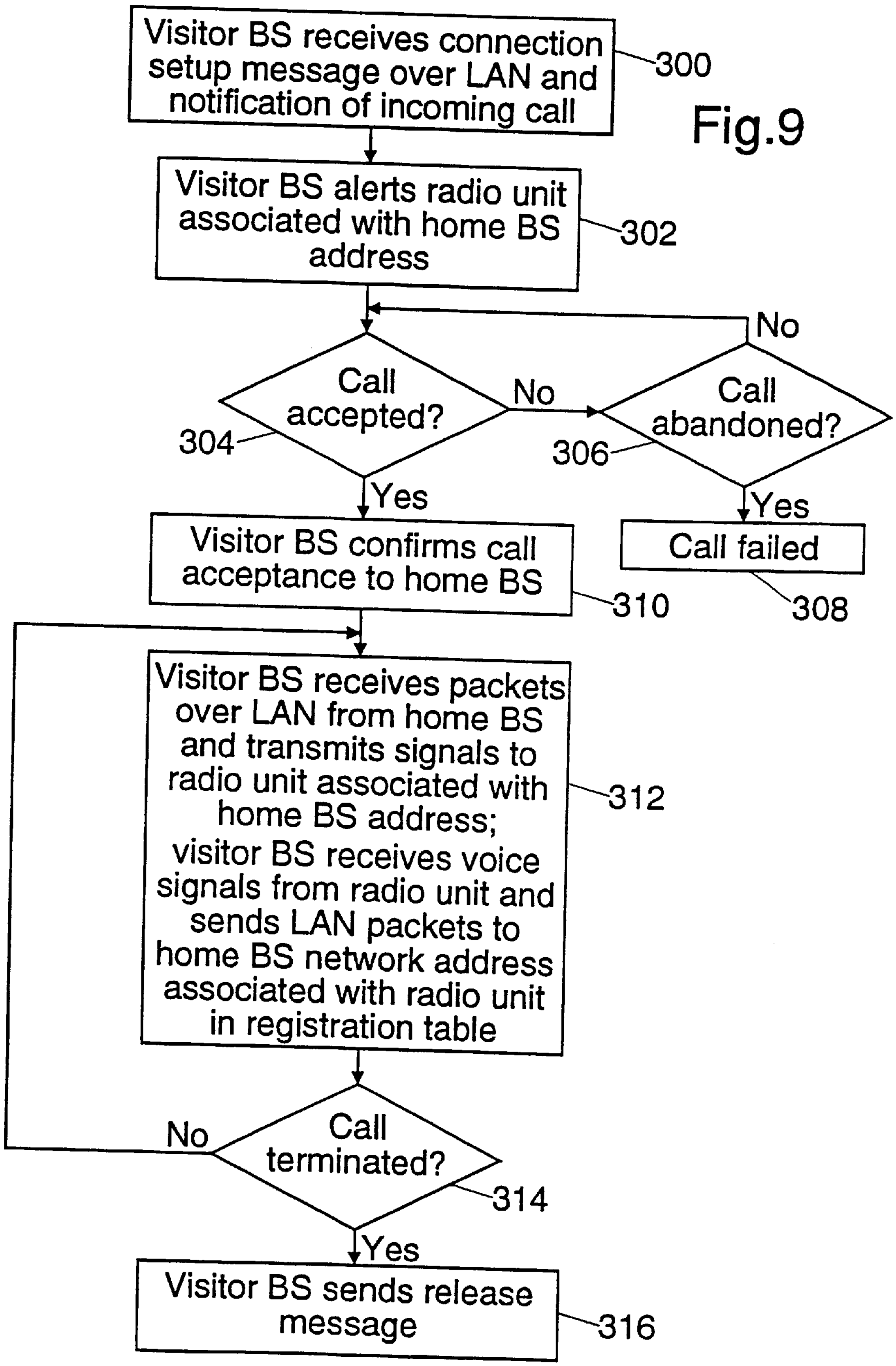
Visitor BS receives connection setup message over LAN and notification of incoming call
300
Fig.9
Visitor BS alerts radio unit associated with home BS address
302
No
Call accepted?
No
Call abandoned?
304
306
Yes
Yes
Visitor BS confirms call acceptance to home BS
Call failed
310
308
Visitor BS receives packets over LAN from home BS and transmits signals to radio unit associated with home BS address; visitor BS receives voice signals from radio unit and sends LAN packets to home BS network address associated with radio unit in registration table
312
No
Call terminated?
314
Yes
Visitor BS sends release message
316

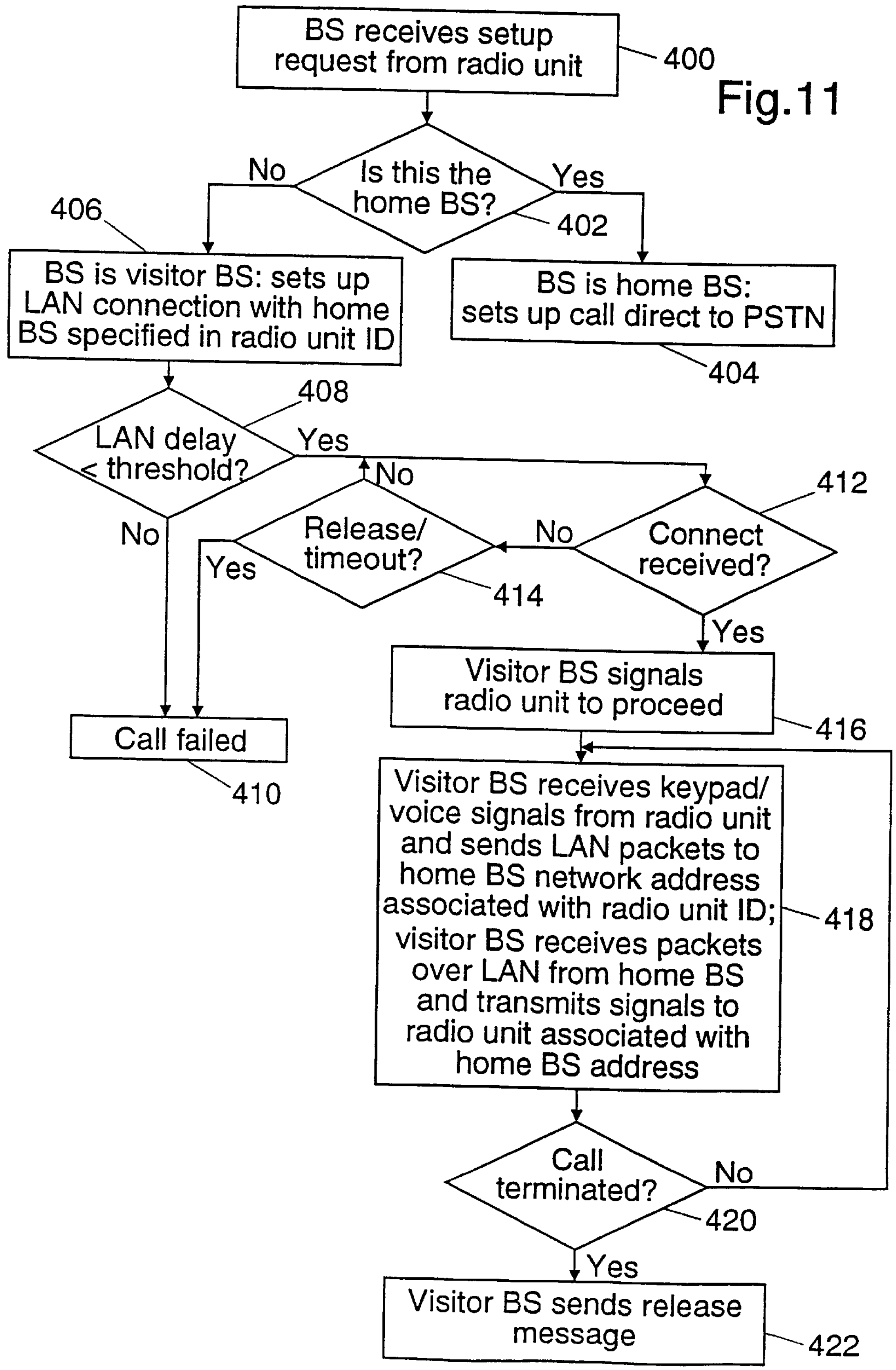
BS receives setup request from radio unit
400
Fig.11
Is this the home BS?
No
Yes
402
406
BS is visitor BS: sets up LAN connection with home BS specified in radio unit ID
BS is home BS: sets up call direct to PSTN
404
408
LAN delay < threshold?
Yes
No
No
412
Release/ timeout?
No
Connect received?
Yes
414
Yes
Visitor BS signals radio unit to proceed
Call failed
416
410
Visitor BS receives keypad/ voice signals from radio unit and sends LAN packets to home BS network address associated with radio unit ID; visitor BS receives packets over LAN from home BS and transmits signals to radio unit associated with home BS address
418
Call terminated?
No
420
Yes
Visitor BS sends release message
422

BASE STATION FOR A TELECOMMUNICATIONS SYSTEM

TECHNICAL FIELD

This invention relates to a base station for a telecommunications system, in particular, though not exclusively, for providing mobile communications.

BACKGROUND ART

Various kinds of apparatus and methods for providing mobile communications are known. Thus, for example, mobile telephone systems are now available which enable a user to place telephone calls over the public switched telephone network (PSTN) without having a physical wired link to the network. These systems include so-called cordless or in-building services, based for example on the CT-2 or Digital European Cordless Telecommunications (DECT) standards, which provide relatively short-range services within an area such as a user's workplace. A unit implementing the DECT air interface typically comprises a base station, including a low-power radio transceiver, and a mobile radio handset module containing a second transceiver for communicating with the base station. The base station is connected by a telephone line to the PSTN, either directly or via a private automatic branch exchange (PABX). This has the disadvantage that although each additional DECT unit installed in an organization requires either a dedicated PSTN line or a PABX line, it offers no more than a mobile extension to the respective user's phone line. Providing additional facilities such as the ability to contact any mobile handset wherever it is currently located in a building requires significant capital investment by way of installation or upgrading of a PABX. Furthermore, if an organization invests in additional DECT units, the only benefit is the simple incremental expansion of the number of DECT base stations there is no interaction between the DECT base stations to exploit the extended area of coverage provided by the base stations considered together.

It is also known to provide mobile communications in systems involving a local area network (LAN). Thus European patent application No. 0 479 477 describes a distributed switching cellular communication system in which signals intended for a radio module are routed between base stations via a LAN as the radio module moves from the service area of one base station into the service area of another.

Disclosure of Invention

According to one aspect of this invention there is provided a base station for a telecommunications system, comprising:

a wireless interface;

a LAN interface;

a third interface;

a switching device arranged selectively to interconnect said interfaces for transfer of signals therebetween in any of the following arrangements:

(a) said wireless interface is connected for transfer of signals directly to and from said third interface;

(b) said wireless interface is connected for transfer of signals directly to and from said LAN interface;

(c) said LAN interface is connected for transfer of signals directly to and from said third interface, said switching device also converting signals between respective forms appropriate for each interface in accordance with prevailing selection of the interfaces for interconnection;

means for identifying origin of signals received via said wireless interface or said LAN interface; and means for controlling said switching device for transfer to said third interface of only those signals having a predetermined origin.

The third interface may be, for example, any of a public switched telephone network interface, a serial communications interface or an integrated services digital network interface. Where the third interface is a public switched telephone network interface, the wireless interface may be arranged to support wireless communications with a wireless telephone handset specifically associated with the base station.

BRIEF DESCRIPTION OF DRAWINGS

A base station in accordance with this invention for a system for mobile communications will now be described, by way of example, with reference to the accompanying drawings, in which:

FIG. 1 shows a mobile communications system;

FIG. 2 is a schematic block diagram of a base station forming part of the system of FIG. 1;

FIG. 4 shows one operational configuration of the base station of FIG. 2;

FIG. 5 shows complementary operational configurations of two of the base stations of FIG. 2;

FIG. 7 is a flow chart of operations involved in registering presence of a radio unit forming part of the system of FIG. 1 within a service area of a base station;

FIG. 8 is a flow chart of principal operations performed by a base station receiving an incoming telephone call;

FIG. 9 is a flow chart of principal operations performed by a base station forwarding an incoming telephone call to a radio unit;

FIG. 11 is a flow chart of principal operations performed by a base station receiving an outgoing telephone call from a radio unit;

BEST MODE FOR CARRYING OUT OF THE INVENTION, & INDUSTRIAL APPLICABILITY

Figure 3B:
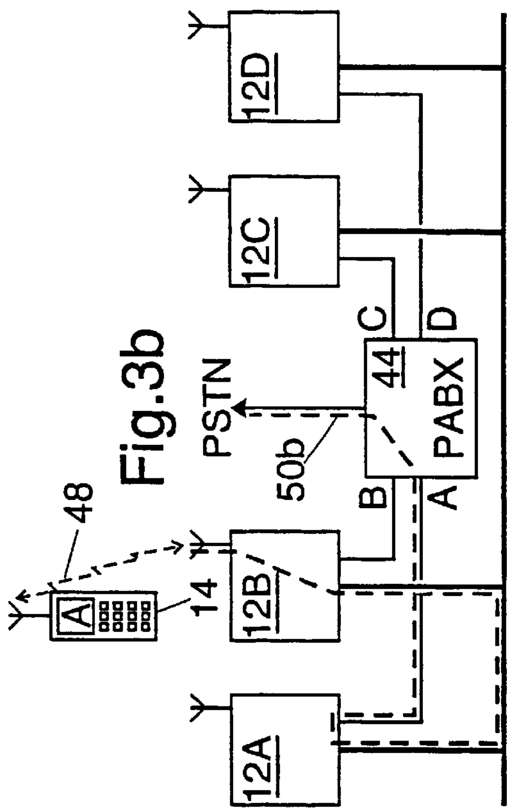
FIGS. 3*a* to 3*h* show different possible operational configurations of the system.

Referring to FIG. 1, a system 10 for mobile communications comprises several base stations 12; each base station has a respective mobile radio unit uniquely associated with it (in the case of voice and serial data communications) in a manner explained hereinafter. Each base station is typically assigned to an individual user, and is located in a convenient position in or adjacent to that user's normal work area (e.g. office, cubicle or desk). A radio unit may comprise, for example, a cordless telephone handset 14, or a radio module 16 designed to be connected to an input/output port (for example serial, parallel, infra-red or PCMCIA) of a portable computing or information device such as is shown at 18.

Several different communications facilities can be provided by the base stations 12. Voice communications can take place from any cordless handset 14 either to another of the handsets or to a telephone outside the system 10 and connected to the PSTN; 'PSTN' and 'public switched telephone network' are used herein to refer to any network for providing telephone and related communications between devices, including the conventional telephone network based on fixed telecommunications links, the public land mobile network (PLMN) for mobile telephones, etc. Serial communications, using for example the RS232 protocol, can take place in similar manner between, for example, two information devices, one of which may be outside the system 10. Data can be communicated using a packet (LAN) protocol between any appropriately equipped computing or information device 18 and any other device connected with the system 10 for LAN communications.

A base station may have various different configurations, depending on which particular combination of communication facilities is desired. One specific, preferred configuration is shown in FIG. 2. Referring to FIG. 2, an individual base station 12 in this configuration has five main components:

a radio interface 20 connected to a radio antenna 22 and designed to operate in accordance with a cordless telephone protocol such as the DECT protocol; the range of signals from the radio antenna is of the order of one hundred metres—this range defines the service area of the base station 12;

a telephone interface 24 connected to a standard telephone jack plug 26 and designed to be coupled to a PSTN line, either directly or via a PABX;

a LAN interface 28 connected to an appropriate LAN connector 30 (e.g. a co-axial plug) and designed to operate in accordance with a standard LAN protocol, such as the IEEE 802.3 standard or the IEEE 802.12 standard;

a serial interface 32 connected to an appropriate multipole connector 34 (e.g. a 9-pin or 25-pin D connector) and designed to operate in accordance with a standard serial communications protocol, such as the RS232 protocol; and a control unit 36 which is coupled to each of these interfaces to coordinate their operation, and to route communications between them as described below with appropriate conversion between their respective signal formats and protocols, to support the functions provided by the radio units.

Instead of the telephone interface 24, the base station 12 may have an interface for connection to a higher bandwidth PSTN service, such as an integrated services digital network (ISDN) interface. Likewise the interface 20 may utilize any appropriate wireless technology, such as infra-red communications.

All of these components of the base station are interconnected by links 38 by means of which communications traversing the base station and control signals can be transferred between the different components as necessary. The radio interface 20 is capable of handling, and distinguishing messages for, several different DECT channels simultaneously, in accordance with the DECT protocol standard; likewise, the control unit 36 and the LAN interface 28 can handle and distinguish messages for multiple communications paths simultaneously, as described hereinafter.

Referring again to FIG. 1, each base station 12 is coupled to a LAN 40, via its respective LAN connector 30. This LAN itself operates in conventional manner to transfer packets of data between stations or nodes connected to it, and may also exchange data packets with other networks via known devices such as bridges (as shown at 42) and routers. The LAN 40 may be based on any appropriate network technology, such as Ethernet (e.g. IEEE 802.3) or 100VG-AnyLAN (i.e. IEEE 802.12); however, as the LAN is handling voice traffic it should either be dedicated solely to supporting the system 10, or use high-speed (100+Mbit/s) technology. Several different communication protocols implementing higher levels of the OSI seven-layer model for network architecture can run on the LAN 40. Base stations on the LAN each have an identifying address, dependent on the LAN protocol in use, for example related to layer 3 (IP address) or layer 4 (TCP address) of the OSI model. In FIG. 1 the IP addresses of the base stations are represented by the letters A, B, C, etc. associated with each base station; the notation 12A, 12B, 12C is used herein to refer to the individual base stations 12 whose respective LAN addresses are A, B, C, etc., whereas the reference numeral 12 without any suffix is used to refer to the base stations generically, without regard to their individual identities.

Each base station 12 is coupled via its respective telephone jack plug 26 to a respective line of a telephone PABX 44, which is in turn connected to the PSTN. In addition, a base station may be coupled via its multipole connector 34 to an auxiliary communications device; thus, for example, the base station 12E is shown coupled to a modem 46, which is in turn connected to the PABX 44 by the telephone line for the base station 12E. Facilities such as PSTN lines and modems are resources which typically cannot be shared between multiple users: at any specific time only one user can be involved in active voice or serial data communications to another user via a specific PSTN line and/or modem. In contrast, LAN technology enables multiple users to share the same physical communications resources at the same time. Accordingly the arrangements for voice and serial data communications are different from those for LAN communications, and will be described first.

As noted earlier, each base station 12 has associated with it one or more radio units, such as a cordless telephone handset 14 or a radio module 16.

There is a specific, individual association of identity between each radio unit and a respective base station 12, so that the base station 12 in question functions as the 'home' base station for the associated radio unit. This association of identity is implemented by using 'subscription', a feature present in every unit implementing the DECT protocol, so as to provide the radio unit with a mobile identifier indicating the required association; this identifier is based on the IP address of the relevant base station 12. Each radio unit has a single home base station, but a base station may be the home station for more than one radio unit.

The handsets 14 are designed to provide relatively short-range cordless voice communications with a base station 12, using a DECT air interface. One of these handsets (14A) has a mobile identifier based on the IP address of the base station 12A, which is thus the home base station for this handset; likewise, the handset 14D has the base station 12D as its home base station, and that station's IP address is the basis for its mobile identifier. The radio module 16 is designed to provide cordless serial data communications with a base station 12, again using a DECT air interface. This module 16E is specifically associated with the base station 12E as its home base station, and so has the IP address of that station as the basis for its identifier.

Before a radio unit can operate as part of the system 10, it must be subscribed to a base station 12 as its home base station. This typically occurs when a radio unit is first activated within range of, or temporarily wired to, one of the base stations 12 in the system 10 (e.g. the base station 12 with which it was supplied, soon after installation of that base station). The radio unit will not have a mobile identifier at this point, and upon making contact with a base station 12 it therefore requests an identifier. Assuming the control unit 36 in the base station is able to accept an additional radio unit subscription, it updates a 'subscription' table (e.g. in the memory 62) of radio units subscribed to it to include the new unit and store an associated authentication code; the control unit also updates a 'registration' table to indicate that the radio unit is 'registered' with that station (as described in more detail below); finally the control unit 36 sends an 'accept' message to the radio unit, informing it of the mobile identifier and a seed value from which the radio unit can independently derive the authentication code. As noted above, the identifier contains the IP address of the base station 12; a radio unit reference (e.g. based on a count of units already subscribed to the base station) is appended to the IP address to identify the new radio unit uniquely. Upon receiving the accept message the radio unit extracts the mobile identifier and seed value and stores them internally (e.g. in a non-volatile memory such as an EEPROM or a flash memory unit) for future use. A base station's control unit 36 typically can only accept subscription requests from some predetermined maximum number of radio units (e.g. in relation to availability in the base station of memory and other resources required to support each subscribed unit). If the base station already has this maximum number of units subscribed to it, the control unit 36 sends the new radio unit a 'reject' message; in this case the subscription operation must be attempted with another base station before the radio unit can become operational.

Every time a radio unit is switched on, or while switched on is moved into the service area of a base station 12 (as indicated by strength of signals received from the base station), a registration procedure occurs. This procedure is described in detail below; in summary the radio unit scans the available DECT channels and identifies the base station whose received signal strength is greatest; it then transmits a request for registration of its presence to that base station, and includes its mobile identifier in the request. Unless there is a problem the control unit 36 in the base station updates its registration table to indicate that the radio unit is located within that station's service area; if the base station is not the radio unit's home base station it is considered to be a 'visitor' base station, and it therefore also communicates the location of the radio unit back to that unit's home base station.

The manner in which voice and serial data communications to and from a radio unit are routed depends on whether the radio unit is registered with its home base station. There are two principal cases, as follows:

(I) the radio unit is registered with its home base station;

(II) the radio unit is not registered with its home base station, but instead is registered with a visitor base station.

In both cases voice and serial data communications to and from the radio unit in the preferred implementation of the invention always traverse that unit's home base station, either alone (case I) or via one (and only one) other base station (case II). Case II has two possible variants:

(IIa) the radio unit is communicating with another device which is not in radio contact with the visitor base station (e.g. because communications are taking place via the PSTN, or because the other device is a radio unit registered with a different base station);

(IIb) the radio unit is communicating with another radio unit which is also registered with the same base station.

It is possible to arrange for all communications in variant IIb to traverse one base station only which is common to both radio units involved, irrespective of whether that base station is the home base station for either unit. However, this implementation entails significantly more complexity, and duplication of functions normally provided by the PABX 44, and is therefore not preferred.

FIGS. 3*a* to 3*h* show the various possible configurations by which communications are routed between on the one hand a radio unit (in this example a handset 14) registered with either its home or a visitor base station, and on the other hand either the PABX, or another handset 14 registered with its respective home base station or a visitor base station. FIGS. 4 and 5 show the corresponding routing of communications within a base station 12, as described below.

Figure 3A:
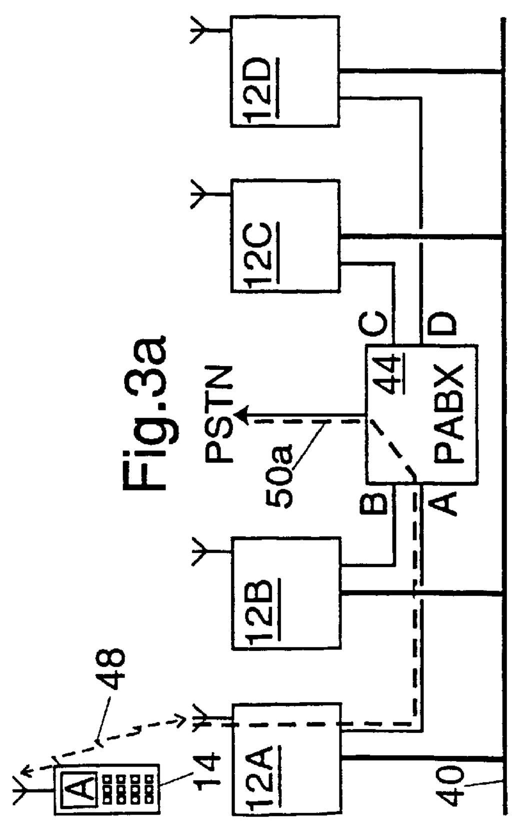

The simplest situation, in which the handset 14A is registered with its home base station 12A and is communicating via the PABX 44 and the PSTN, is shown in FIG. 3*a*. In this case control unit 36 in the base station 12A routes communications internally between its associated radio interface 20 and telephone interface 24, as shown in FIG. 4. Thus communications for the handset 14A traverse the following path:

- a DECT wireless channel (indicated at 48) between the handset and the base station;
- the radio interface 20, control unit 36 and telephone interface 24 in the base station; and
- the telephone line for that base station to the PABX 44 and thence to the PSTN.

This communications path is indicated in FIG. 3*a* by a dashed line 50*a*.

If the handset 14A is registered with another (i.e. visitor) base station, such as the base station 12B, the communications path is as shown at 50*b* in FIG. 3*b*. In this case the control unit 36 in the base station 12B routes communications internally between its associated radio interface 20 and LAN interface 28, as shown in the upper part of FIG. 5, and the control unit in the base station 12A routes its internal communications between its associated LAN interface 28 and telephone interface 24, as shown in the lower part of FIG. 5. The path 50*b* traverses:

- the DECT wireless channel 48 between the handset 14A and the visitor base station 12B;
- the radio interface 20, control unit 36 and LAN interface 28 in the visitor base station 12B;
- the LAN 40, to the home base station 12A;
- the LAN interface 28, control unit 36 and telephone interface 24 in the home base station 12A; and
- the telephone line for the home base station 12A to the PABX 44 and thence to the PSTN.

Voice communications between the handset 14A and another handset 14D, when both are registered with their respective base stations 12A and 12D, follow the path shown in FIG. 3*c*, as follows:

- the DECT wireless channel 48 between the handset 14A and its home base station 12A;
- the radio interface 20, control unit 36 and telephone interface 24 in the base station 12A (configured as shown in FIG. 4);
- the telephone line linking the base station 12A and the PABX 44;
- the PABX 44;
- the telephone line linking the base station 12D and the PABX 44;
- the telephone interface 24, control unit 36 and radio interface 20 in the base station 12D (also configured as shown in FIG. 4); and a DECT wireless channel indicated at 52, between the handset 14D and its home base station 12D.

The part of this path between the handset 14A and the PABX 44 is indicated by the dashed line 50*c*, and its counterpart between the handset 14D and the PABX is indicated by the short-dashed line 54*c*.

Figure 3D:
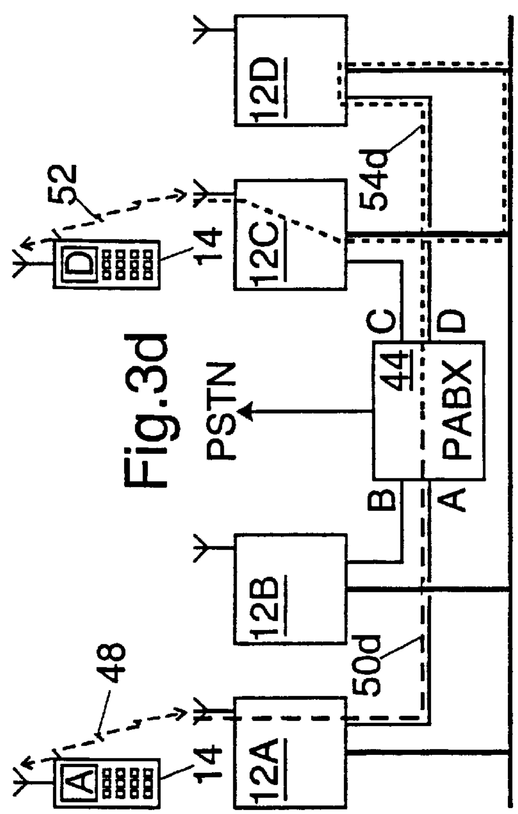
Figure 3C:
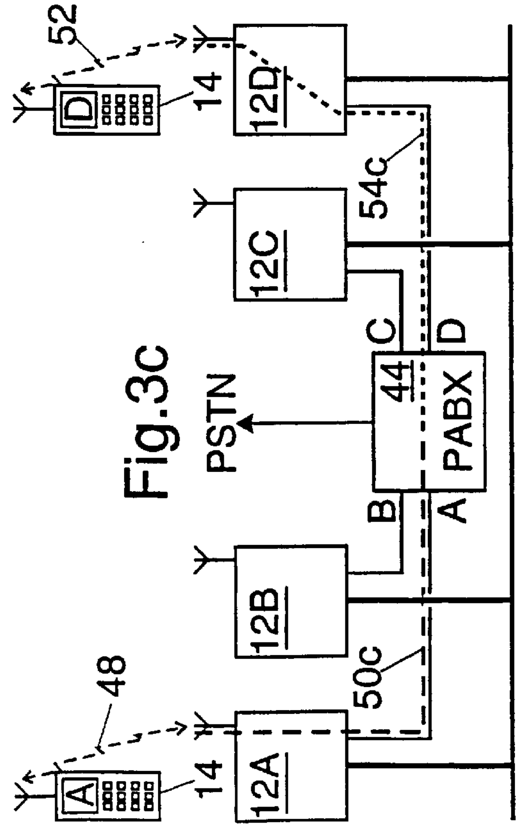

If the handset 14D is instead registered with the visitor base station 12C, for example, as shown in FIG. 3*d*, voice communications between the handsets 14A and 14D follow a path comprising a part 50*d*, the same as the part 50*c* in FIG. 3*c*, between the handset 14A and the PABX 44, and a counterpart 54*d* between the handset 14D and the PABX comprising:

the telephone line linking the base station 12D and the PABX 44;

the telephone interface 24, control unit 36 and LAN interface 28 in the base station 12D (configured as shown in the lower part of FIG. 5);

the LAN 40, to the visitor base station 12C;

the LAN interface 28, control unit 36 and radio interface 20 in the visitor base station 12C (configured as shown in the upper part of FIG. 5); and the DECT wireless channel 52 between the handset 14D and the visitor base station 12C.

When both handsets 14A and 14D are registered with respective different visitor base stations, such as 12B and 12C (FIG. 3*e*), the voice communications between the handsets follow a path comprising parts 50*e* and 54*e*, as follows:

the DECT wireless channel 48 between the handset 14A and the visitor base station 12B;

the radio interface 20, control unit 36 and LAN interface 28 in the visitor base station 12B (configured as shown in the upper part of FIG. 5);

the LAN 40, to the home base station 12A;

the LAN interface 28, control unit 36 and telephone interface 24 in the home base station 12A (configured as shown in the lower part of FIG. 5);

the telephone line linking the home base station 12A and the PABX 44;

the PABX 44;

the telephone line linking the second home base station 12D and the PABX 44;

the telephone interface 24, control unit 36 and LAN interface 28 in the base station 12D (configured as shown in the lower part of FIG. 5);

the LAN 40, to the second visitor base station 12C;

the LAN interface 28, control unit 36 and radio interface 20 in the visitor base station 12C (configured as shown in the upper part of FIG. 5); and the DECT wireless channel 52 between the handset 14D and the visitor base station 12C.

Figure 3F:
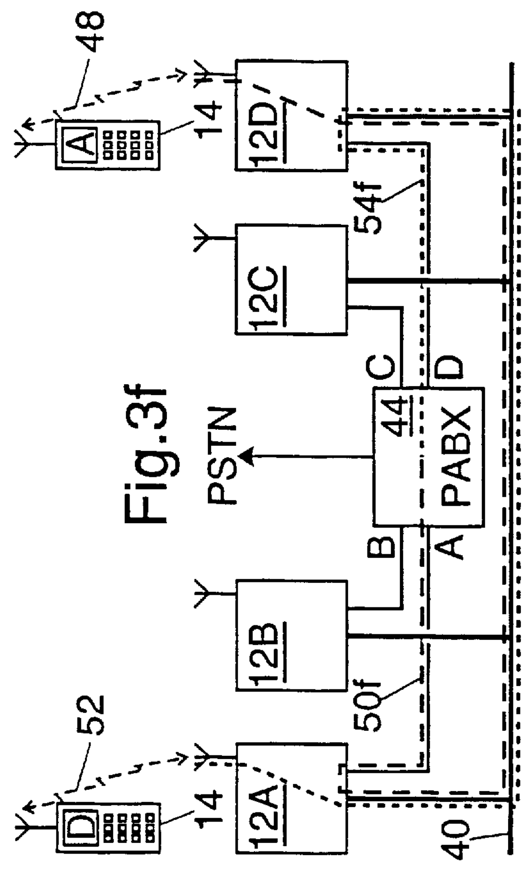

A particular case of the previous situation occurs when each handset 14A, 14D is registered with the other handset's home base station, as shown in FIG. 3*f*, in these circumstances the communications between the handsets follow a path 50*f* and 54*f* comprising:

the DECT wireless channel 48 between the handset 14A and the base station 12D (in its capacity as visitor base station for the handset 14A);

the radio interface 20, control unit 36 and LAN interface 28 in the base station 12D (configured, in respect of communications with the radio interface 20, as shown in the upper part of FIG. 5);

the LAN 40, to the base station 12A (as home base station for the handset 14A);

the LAN interface 28, control unit 36 and telephone interface 24 in that base station 12A (configured, in respect of communications with the telephone interface 24, as shown in the lower part of FIG. 5);

the telephone line linking the base station 12A and the PABX 44;

the PABX 44;

the telephone line linking the base station 12D (as home base station for the handset 14D) and the PABX 44;

the telephone interface 24, control unit 36 and LAN interface 28 in that base station 12D (configured, in respect of communications with the telephone interface 24, as shown in the lower part of FIG. 5);

the LAN 40, to the base station 12A (as visitor base station for the handset 14D);

the LAN interface 28, control unit 36 and radio interface 20 in the base station 12A (configured, in respect of communications with the radio interface 20, as shown in the upper part of FIG. 5); and the DECT wireless channel 52 between the handset 14D and the visitor base station 12A.

It can be seen that in the circumstances shown in FIG. 3*f* the two base stations 12A and 12D each have two distinct communication paths traversing them (albeit both paths are carrying the same message stream and both paths involve the LAN interface 28 in each base station). The control units 36 in the base stations 12 are capable of distinguishing different parts of a communication path which exist simultaneously in this manner, and of routing individual messages appropriately (e.g. from the LAN interface 28 to the radio interface 20 or the telephone interface 24) in accordance with the part of the communication path to which each message belongs.

Figure 3E:
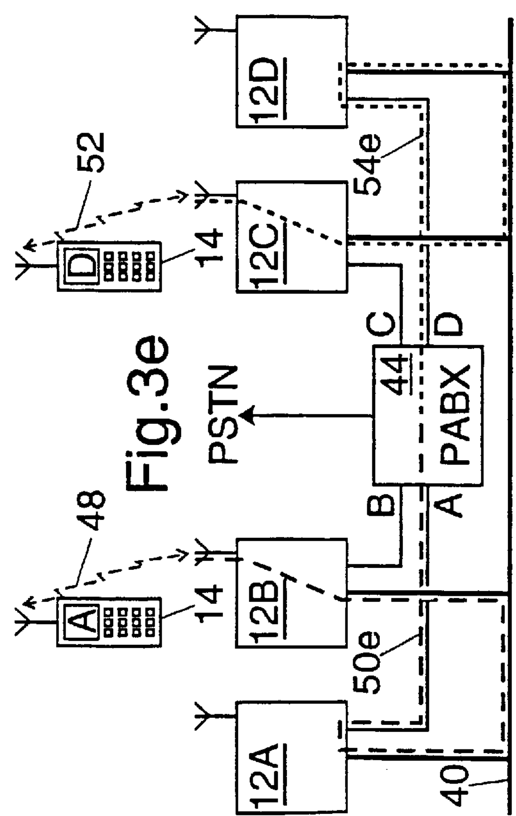

In a variation of the case illustrated in FIG. 3*f*, the handset 14D is registered with the base station 12A (i.e. the home base station for the handset 14A), but the handset 14A is registered with, for example, the base station 12B (and thus, as in FIG. 3*e*, not with the home base station 12D of the handset 14D). The communication path between the handsets 14A and 14D in this case comprises a combination of the part 50*e* of FIG. 3*e* for the handset 14A and the part 54*f* of FIG. 3*f* for the handset 14D.

Figure 3H:
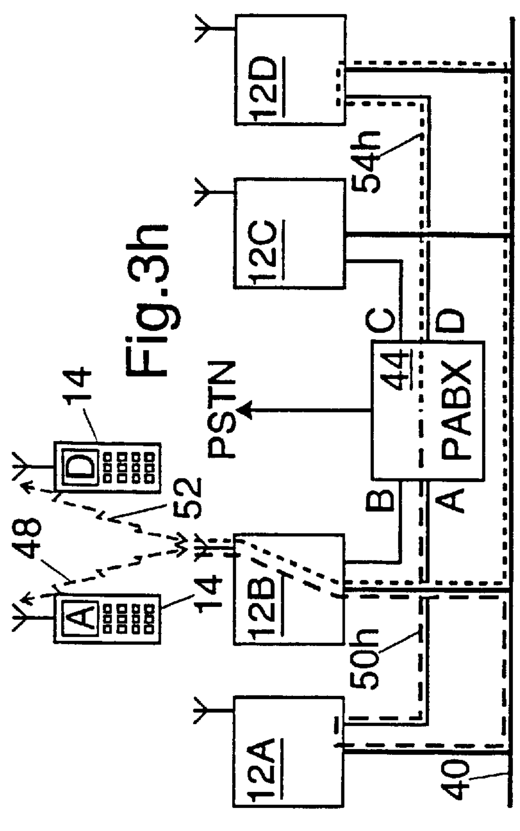
Figure 3G:
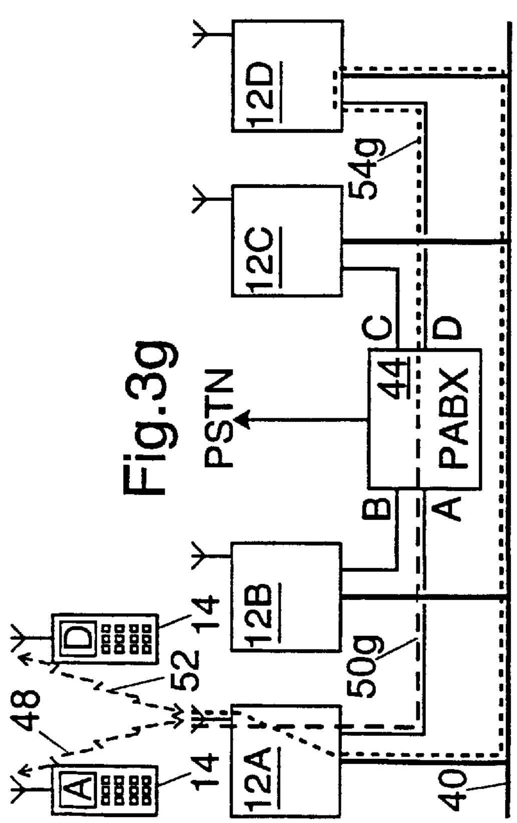

If both handsets 14A and 14D are registered with the home base station 12A of the handset 14A, communications between them follow the path 50*g* plus 54*g* shown in FIG. 3*g*:

the DECT wireless channel 48 between the handset 14A and the base station 12A (as home base station for the handset 14A);

the radio interface 20, control unit 36 and telephone interface 24 in the base station 12A (configured, in respect of communications with the telephone interface 24, as shown in FIG. 4);

the telephone line linking the base station 12A and the PABX 44;

the PABX 44;

the telephone line linking the home base station 12D for the handset 14D and the PABX 44;

the telephone interface 24, control unit 36 and LAN interface 28 in that base station 12D (configured as shown in the lower part of FIG. 5);

the LAN 40, to the base station 12A (as visitor base station for the handset 14D);

the LAN interface 28, control unit 36 and radio interface 20 in the base station 12A (configured, in respect of communications with the LAN interface 28, as shown in the upper part of FIG. 5); and the DECT wireless channel 52 between the handset 14D and the visitor base station 12A.

As in FIG. 3*f*, the control unit 36 in the base station 12A routes different messages between the radio interface 20 and either the telephone interface 24 or the LAN interface 28 according to the part of the communications path to which they belong.

The final configuration which can occur is shown in FIG. 3*h*, in which both handsets 14A and 14D are registered with a base station 12B which is not the home base station of either handset. Voice communications between the handsets 14 follow the path 50*h* plus 54*h*, as follows:

the DECT wireless channel 48 between the handset 14A and the visitor base station 12B;

the radio interface 20, control unit 36 and LAN interface 28 in the base station 12B (configured as shown in the upper part of FIG. 5);

the LAN 40, to the home base station 12A for the handset 14A;

the LAN interface 28, control unit 36 and telephone interface 24 in that base station 12A (configured as shown in the lower part of FIG. 5);

the telephone line linking the base station 12A and the PABX 44;

the PABX 44;

the telephone line linking the home base station 12D for the handset 14D and the PABX 44;

the telephone interface 24, control unit 36 and LAN interface 28 in that base station 12D (configured as shown in the lower part of FIG. 5);

the LAN 40, to the visitor base station 12B;

the LAN interface 28, control unit 36 and radio interface 20 in the visitor base station 12B (configured as shown in the upper part of FIG. 5); and the DECT wireless channel 52 between the handset 14D and the visitor base station 12B.

In this case the control unit 36 in the visitor base station 12B distinguishes messages arriving via the station's LAN interface 28 as being intended for either the handset 14A or the handset 14D in accordance with address information contained in the LAN packets, and instructs the radio interface 20 to route the messages over the appropriate DECT channel.

Figure 6:
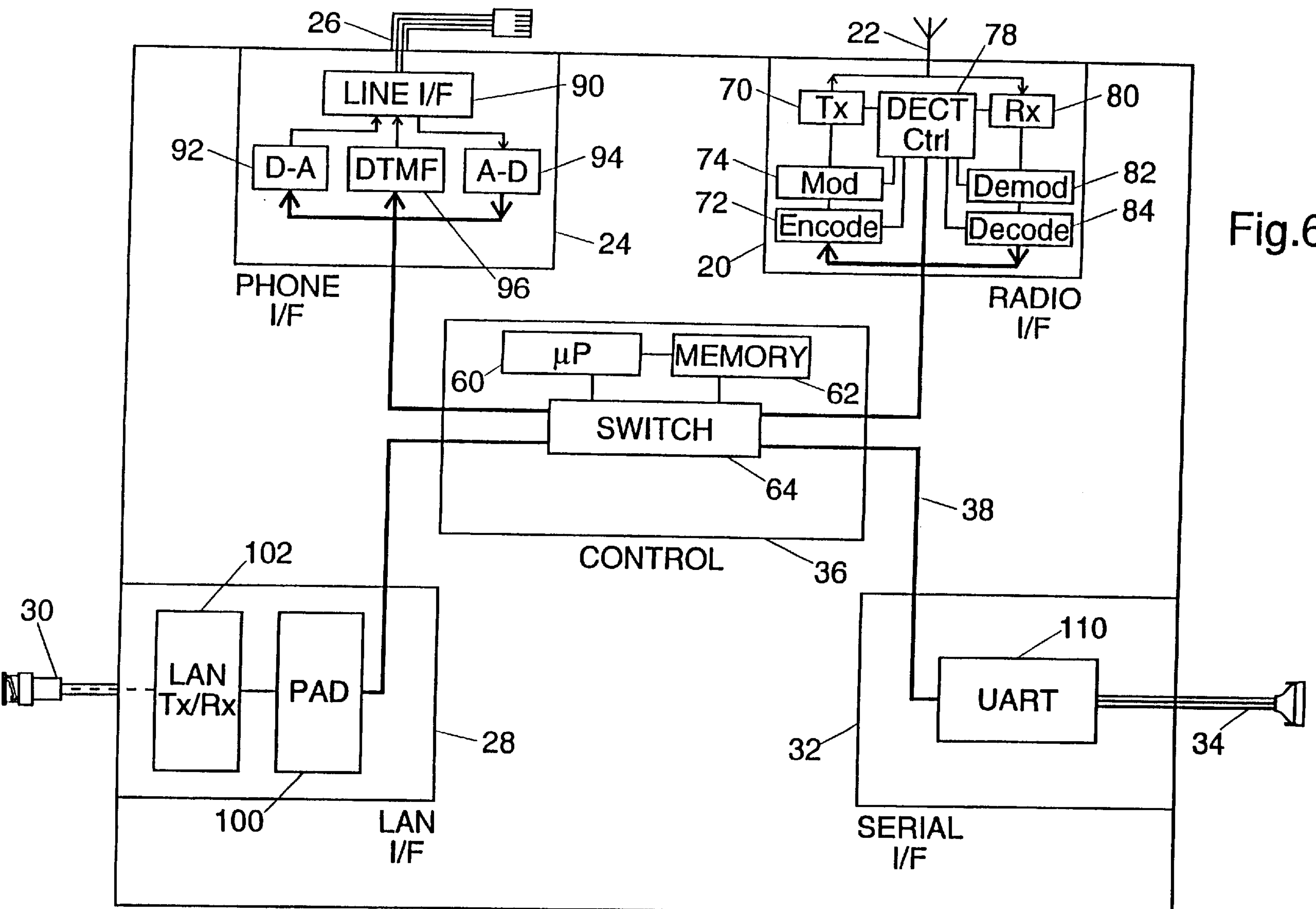
FIG. 6 is a more detailed schematic block diagram of the base station of FIG. 2.

FIG. 6 shows the main components of a base station 12 in more detail. Referring to FIG. 6, the control unit 36 includes a micro-processor 60 for coordinating the operation of the base station under the control of software stored in a memory 62. This software implements various management functions, such as subscription of a radio unit to establish its home base station, registration of a radio unit at a visitor base station, and coordination of operation of the interface components of the base station. To enable this coordination and to interconnect the interface components, the base station includes a switch 64 coupled to each interface component by the communication links 38. This switch may be implemented as a dedicated hardware device or as appropriate communication functions provided by the micro-processor 60 under software control. The switch 64 enables control signals to be passed to each interface component, and data to be passed between the interface components in any combination with appropriate conversion as required between the data and signal formats employed by each interface component.

The radio interface 20 includes a transmitter 70 and receiver 80 each connected to the antenna 22. The transmitter 70 receives data from the associated link 38 via an encoder 72 and modulator 74, and the receiver 80 supplies data to the link via a demodulator 82 and decoder 84. The operation of all these modules in the radio interface 20 is coordinated in accordance with the DECT protocol by a DECT controller 78, which is also directly coupled to the link 38.

The telephone interface 24 includes a line interface 90 for safe connection of the base station to telephone circuitry (i.e. the PABX 44 or the PSTN itself) in conformity with regulatory requirements. Unless the PABX 44 uses digital transmission, digital data on the link 38 associated with the telephone interface are converted into analogue form by a digital-to-analogue (D-A) converter 92 for transmission over the telephone line, and received analogue signals are converted by an analogue-to-digital (A-D) converter 94 into digital form for communication over the link 38. In addition a dual-tone multi-frequency (DTMF) module 96 converts signals (e.g. for dialling) resulting from operation of a keypad of a handset 14 into appropriate tones for transmission of the identity of pressed keys over the telephone network.

The LAN interface 28 comprises a packet assembler-disassembler (PAD) 100 for converting data between its format as received over the associated link 38 and the appropriate packet format for the LAN to which the base station 12 is coupled. LAN packets are transmitted and received by a LAN transceiver 102.

The serial interface 32 contains a universal asynchronous receiver-transmitter (UART) 110 for converting between data as received over the associated link 38 and data signals propagating in bit-serial form at an appropriate bit rate via the connector 34.

The registration procedure which is implemented when a radio unit is switched on, or moved out of the service area of one base station 12 into the service area of another, is illustrated in the flow chart of FIG. 7.

Referring to FIG. 7, the procedure is initiated at step 120, either when a radio unit is turned on (having previously been subscribed to a base station, and thus already having a mobile identifier) or when changes in received signal strength indicate it has moved into the service area of a different base station. In this step the radio unit transmits a request to the base station in whose service area it is located for registration of the unit's presence, and includes in the request its mobile identifier and an authentication value based on the authentication code derived from the seed value previously supplied by its home base station.

Upon reception of this request, the control unit 36 in the base station 12 establishes whether it is the home base station for the radio unit which transmitted the request, by comparing the mobile identifier in the request with the station's own IP address, at step 122. If its IP address is contained in the mobile identifier, the radio unit is identified as being already subscribed to this base station as its home base station, and the procedure advances directly to step 130. At this step the control unit 36 may reject the registration attempt, for example because the base station currently has insufficient spare channel bandwidth to service another radio unit, or because the identity of the radio unit cannot be authenticated; otherwise the control unit 36 updates its subscription and registration tables to indicate that this radio unit is located within the station's own service area. The result of the registration procedure is notified to the radio unit at step 132. Assuming the procedure is successful, at step 134 the base station checks whether the new information recorded in the subscription table at step 130 implies that the radio unit was previously registered with another base station. If it was, the other base station is notified at step 136, via the LAN 40, that the radio unit is no longer located in its service area, so that the control unit 36 in that other station can update its registration table, at step 138.

If the test at step 122 indicates that the base station's own IP address is not contained in the mobile identifier in the request from the radio unit, the radio unit is identified as being subscribed to another base station and to be 'visiting' the current base station. The registration procedure continues to step 124, where the control unit 36 in the visitor base station creates a network connection via the LAN 40 with the control unit 36 in the radio unit's home base station (e.g. according to the transmission control protocol, TCP). At step 126 this network connection is used to enable a dialogue between the control units in the visitor base station and in the home base station to be conducted, so that the control unit in the visitor base station can obtain a copy of the entry, including information for checking authenticity, relating to the radio unit in the home base stations's subscription table. At the next step 128 the visitor base station updates its registration table, to show the identity of the radio unit which initiated the registration procedure at step 120 and the identity of its home base station; in addition the new location information for the radio unit, including the IP address of the visitor base station, is sent via the LAN to the home base station. That station updates its subscription table, at step 130, to indicate that the radio unit is now registered with the base station having that IP address. The result of the registration procedure is notified to the radio unit at step 132 by the home base station, via the visitor base station. Then the check at step 134 for any change in the service area location of the radio unit, and any necessary notification and updating at steps 136 and 138, are carried out as previously described.

Figure 10:
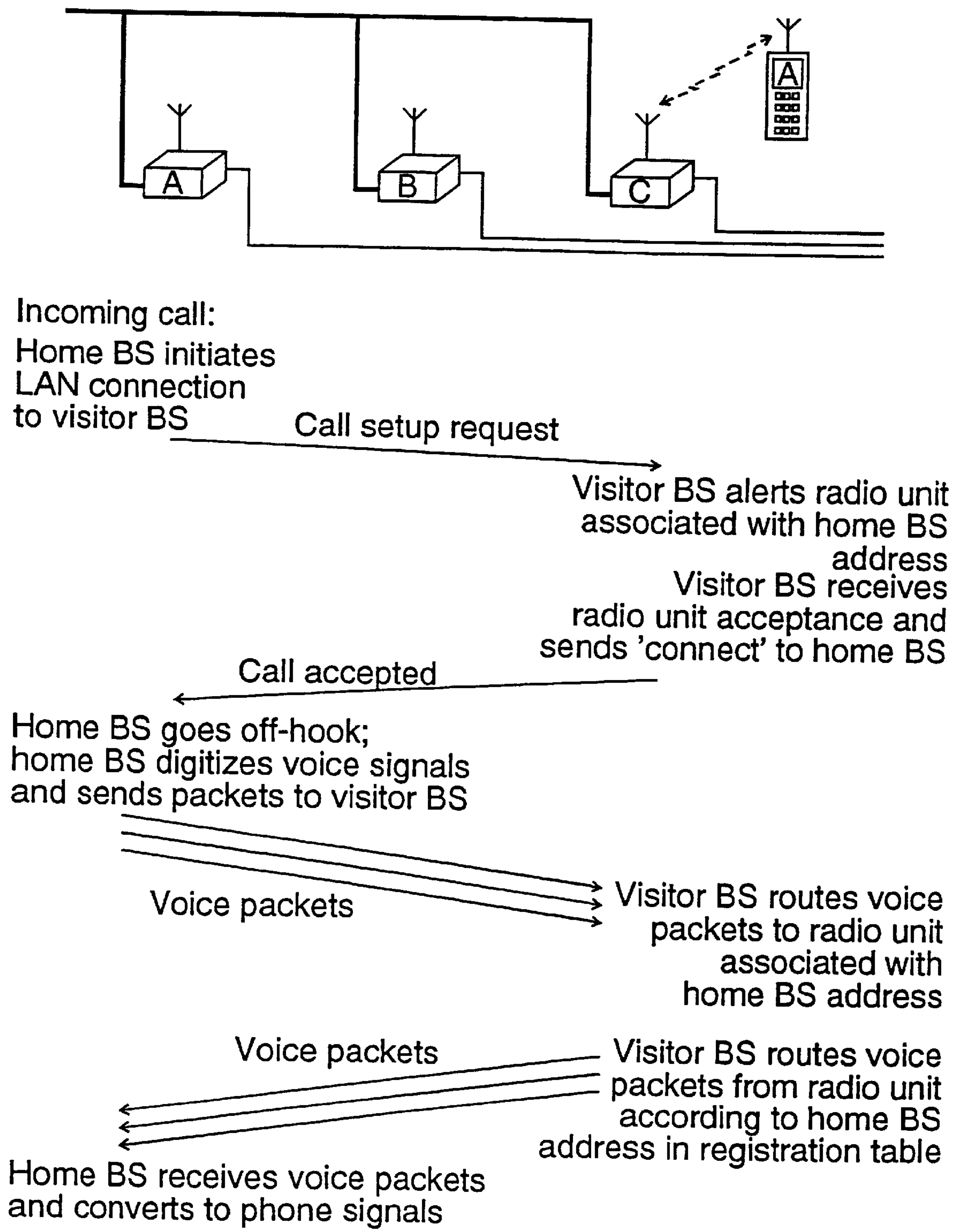
FIG. 10 is a diagram illustrating a protocol implemented in the flow charts of FIGS. 8 and 9, for connecting an incoming telephone call to a radio unit.

The procedures for receiving and originating telephone calls involving a handset 14 are shown in the flow charts of FIGS. 8 and 9, and 11 and 12 respectively; FIGS. 10 and 13 show corresponding flows of messages between base stations 12 in the case of a handset 14 located within the service area of a visitor base station.

Referring to FIG. 8, when a telephone call is made to a radio unit (e.g. the handset 14A), the incoming call arrives via the PSTN and the PABX 44 at the telephone interface 24 in the home base station 12A for that handset, as indicated at step 200. This interface signals the existence of the call to the control unit 36, via the connecting link 38, and at step 202 the control unit checks its registration table to find out whether the handset 14A is currently registered with it. If so the control unit 36 operates the switch 64 to connect the telephone interface 24 to the radio interface 20, and the call is directed to the handset 14A in accordance with the DECT protocol, at step 204.

As noted above, the switch 64 may be implemented by means of communication functions under software control. In this case, 'operation' of the switch 64 to connect the telephone interface 24 to the radio interface 20 may comprise, for example, the establishment by the control unit of a signalling connection over the links 38 between the telephone interface 24 and the radio interface 20 for the transfer of messages and data between those interfaces, in accordance with an appropriate protocol and using known principles for real-time programming to support multiple processes and message transfers between communications 'ports'. Each such connection which is established by the control unit in its base station is distinguished by a respective identifier or 'handle', and every message exchanged between the telephone interface 24 and the radio interface 20 includes the identifier for the connection to which that message relates. Thus, for example, the radio interface 20 can use the identifier to determine which radio channel to use for each message it receives, so that the message is transmitted to the appropriate handset 14. In the case of voice communications a steady flow of data is essential to ensure an acceptable quality of uninterrupted voice signals as perceived by the users; accordingly it is desirable to minimize delays in transferring voice data between interfaces in each base station. To this end, voice data may be transferred between these interfaces along paths which bypass the signalling connections; for example the telephone interface 24 and the radio interface 20 may be enabled to write such data directly to one another's internal circuitry (e.g. buffer memory) at locations specified when the signalling connection is established.

If the registration table indicates that the handset 14A is not registered with the home base station, it must currently be registered with another base station, i.e. a visitor base station, so the call must be directed via that visitor base station. Accordingly at step 206 the control unit 36 instructs the LAN interface 28 to set up a LAN connection to the visitor base station identified in the subscription table as having the handset 14A registered with it for voice communications. This LAN connection may involve, for example, a TCP connection for the exchange of signalling messages between the two stations, and a user datagram protocol (UDP) connection, to be used for exchange of voice packets.

To ensure that the LAN connection will not introduce an excessive delay in the propagation of voice signals, at step 208 the home base station assesses the round-trip return time for a data packet between itself and the visitor base station, e.g. using the process commonly known as 'pinging'. If the LAN delay (equal to one-half of this round-trip time) is not found to be less than a predetermined threshold which will ensure acceptable quality of voice transmission, the home base station determines that the call cannot be set up with an adequate quality. In this case the visitor base station is informed that the call has failed and the LAN connection is released, as indicated at step 210.

If the LAN delay is less than the threshold, the control unit signals the visitor base station that there is an incoming call through the LAN connection, at step 212, and then enters a timed loop comprising steps 214 and 216, to await acceptance of the call. If the call is found, by the test at step 216, to have been abandoned before it is accepted, the visitor base station is informed at step 210 that the call has failed, and the LAN connection is released.

As shown in FIG. 9, at step 300, the control unit 36 in the visitor base station receives the messages setting up the LAN connection and notifying it of the incoming call, and as a result, at step 302, sends a message via its associated radio interface 20 to the handset 14A associated with the base station which sent the LAN messages, to inform the handset of the incoming call. The visitor base station control unit then enters a timed loop comprising steps 304 and 306, to await an acknowledgement from the handset 14A that it can accept the call. If the call is notified as being abandoned, as tested at step 306, the call fails at step 308.

When step 304 indicates that an acknowledgement accepting the call has been received, the control unit in the visitor base station confirms acceptance to the home base station, at step 310. The control unit also operates the switch 64 (for example by establishing a signalling connection over its associated links 38 as described above) to couple its associated radio interface 20 and LAN interface 28 for the transfer of messages and data between those interfaces. The connection is distinguished by a respective identifier which is used within the base station, as previously described, so that for example the LAN interface 28 can determine which LAN connection to use for each message it receives from the radio interface 20. To minimize delays in transferring voice data between these interfaces the data are transferred along paths which bypass the signalling connections; thus the radio interface 20 and the LAN interface 28 are enabled to write such data directly to one another's internal circuitry (e.g. buffer memory) at locations specified when the signalling connection is established.

Referring again to FIG. 8, the acceptance confirmation from the visitor base station is detected by the home base station at step 214, and the control unit in that base station proceeds to step 218, operating its switch 64 (e.g. to establish a signalling connection) to enable the transfer of messages and data over the links 38 between its associated telephone interface 24 and LAN interface 28. Voice signals from the PSTN line are digitized if necessary by the A-D converter 94 in the telephone interface and supplied over the links to the LAN interface, where they are formed into packets addressed to the visitor base station and sent to it over the LAN. Conversely, data in packets received from the visitor base station are extracted by the LAN interface, transferred to the telephone interface and converted by the D-A converter 92 into voice signals to be applied to the PSTN line.

In a complementary manner the visitor base station, at step 312 (FIG. 9), receives packets from the home base station at its LAN interface 28, which extracts the data they contain and supplies these data over the links 38 to the associated radio interface 20 together with the handle identifying the signalling connection between the interfaces to which the data relate (and thus ultimately the handset 14 for which they are destined). The radio interface in turn forwards the voice data to the handset 14A identified by means of that handle. Voice data coming from the handset 14A to the visitor base station are transferred in the reverse path to the LAN interface 28, which assembles packets and sends them over the LAN to the home base station identified by its IP address, stored in the visitor base station's registration table in association with the identity of the handset 14A.

This exchange of packets over the LAN between the two base stations continues until the visitor base station detects termination of the call at step 314 in response to the handset 14 going on-hook, whereupon the base station sends a release message to the home base station at step 316. When the home base station detects the release message at step 220, it clears the call on the PSTN line and releases the LAN connection to the visitor base station, at step 222. The two base stations also operate their switches 64 to remove the connections between their respective interfaces involved in the voice data transfer.

If the handset 14A wishes to originate a call, it sends a setup request, including its mobile identifier, to the control unit 36 of the base station in whose service area it is located, as indicated at step 400 in FIG. 11. The control unit checks at step 402 whether it is located in the home base station for the handset 14A, by testing whether the mobile identifier includes the IP address of that base station. If it is in the home base station, the control unit 36 operates the switch 64 as described above to connect the radio interface 20 to the telephone interface 24 over the links 38, and the call is set up directly within the base station at step 404.

If the mobile identifier does not include the base station's IP address the base station is potentially a visitor base station for the handset 14A. Accordingly the control unit 36 proceeds to step 406, where it checks that the handset 14A is registered with it, and (assuming it is) extracts the IP address of the home base station for the handset from the handset's mobile identifier and instructs the LAN interface 28 to set up a LAN connection (TCP and UDP) with that home base station.

At step 408 the control unit assesses the LAN delay time between the visitor base station and the home base station, as previously described with reference to step 208 of FIG. 8. If the delay time is excessive, as indicated by comparison with the predetermined threshold, the call is deemed to have failed at step 410 and the home base station is notified of this and the LAN connection is terminated. Otherwise the control unit uses the LAN connection to send a message to the home base station to set up a call.

Figure 12:
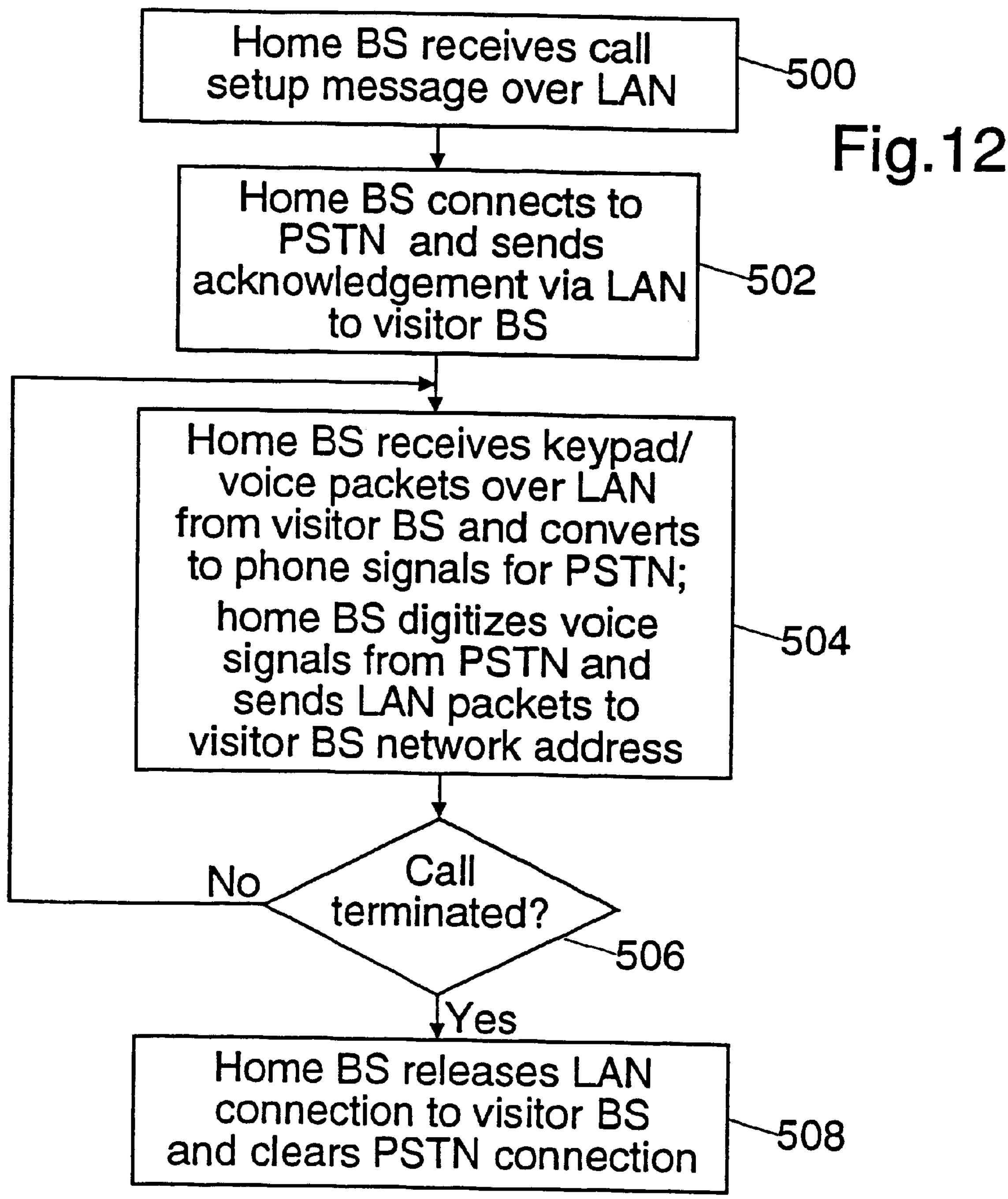
FIG. 12 is a flow chart of principal operations performed by a base station forwarding an outgoing telephone call to the PSTN.
Figure 13:
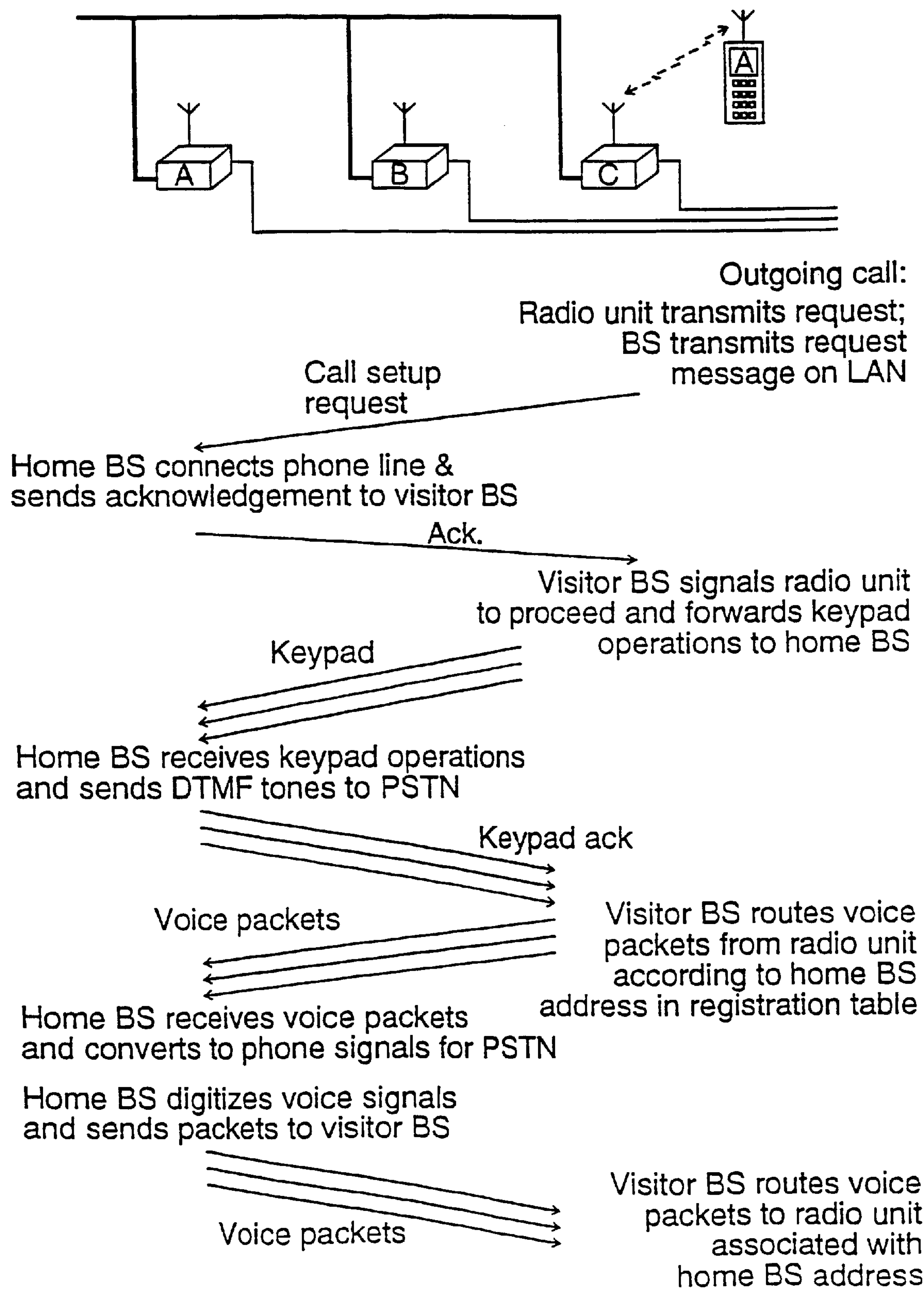
FIG. 13 is a diagram illustrating a protocol implemented in the flow charts of FIGS. 11 and 12, for making an outgoing telephone call from a radio unit.

As shown in FIG. 12, the home base station 14A receives this message at step 500 and, at step 502, its control unit 36 instructs the associated telephone interface 24 to go off-hook and connect to the PSTN line. The control unit 36 also sends an acknowledgement to the visitor base station via the LAN 40 that the connection has been made, and operates its switch 64 to connect the telephone interface 24 and the LAN interface 28 over the links 38 in the home base station.

Referring again to FIG. 11, the visitor base station control unit repeats a loop comprising steps 412 and 414 to await the acknowledgement from the home base station 14A that the PSTN connection has been made. Pending receipt of such acknowledgement the call may be abandoned by the handset 14A, in which case this event is detected at step 414; the home base station is informed of this and the LAN connection is terminated at step 410.

When the acknowledgement is found at step 412 to have been received, the visitor base station control unit proceeds to step 416, where it signals the handset 14A that the call can proceed, and instructs its switch 64 to couple the radio interface 20 and the LAN interface 28 over the associated links 38, e.g. by establishing a signalling connection with a corresponding identifying handle. Keypad data coming from the handset 14A to the visitor base station to identify the number to be dialled, and subsequently voice data, are transferred at step 418 from the radio interface 20 to the LAN interface 28. This latter interface assembles packets and sends them over the LAN to the home base station identified by its IP address, stored in the visitor base station's registration table in association with the identity of the handset 14A. Likewise the LAN interface 28 receives voice data packets from the home base station, extracts the data they contain and supplies these data over the links 38 to the associated radio interface 20, together with the handle identifying the connection over the links 38 to which they relate (and thus the home base station 12A from which they came). The radio interface in turn forwards the voice data to the handset 14A, identified by association with that handle.

In a complementary manner the home base station 12A, at step 504 (FIG. 12), receives keypad and voice data packets from the visitor base station at its LAN interface 28, where the data are extracted from the packets and transferred to the associated telephone interface 24 to be converted by the D-A converter 92 into signals to be applied to the PSTN line. Voice signals from the PSTN line are digitized by the A-D converter 94 in the telephone interface and supplied over the links 38 to the LAN interface, where they are formed into packets addressed to the visitor base station and sent to it over the LAN 40.

The exchange of packets over the LAN between the two base stations continues until the visitor base station detects termination of the call at step 420 (FIG. 11), whereupon it sends a release message to the home base station at step 422. When the home base station 12A detects the release message at step 506 (FIG. 12), it clears the call on the PSTN line and releases the LAN connection to the visitor base station, at step 508. Both base stations also operate their switches 64 to remove the connections established between their respective interfaces when the call was set up.

The handset 14A may be moved sufficiently, while a call is in progress, for it to receive a stronger signal from another base station than the one with which it is currently registered. In this case the handset 14A first registers itself with the new base station, as described with reference to FIG. 7, using a different DECT channel from that being used for the call in progress. If the new base station is the handset's home base station, that base station can then connect its telephone interface 24 to its own radio interface 20, and release the LAN connection to the visitor base station with which the handset was previously registered. If, on the other hand, the new base station is a visitor base station, it establishes a LAN connection to the handset's home base station, as described with reference to FIG. 11, and requests the home base station to address further data packets to it. When this changeover has been accomplished the base station with which the handset 14 was previously registered is notified so that it can update its tables and release its LAN connection to the home base station.

Serial data communications are supported by the base stations 12 in a similar manner to voice communications, but using the serial interface 32 in each base station in place of the telephone interface 24 where appropriate.

However, communication of data using a packet protocol over the LAN 40 is implemented differently. If a radio unit is to be involved in such data communication, that unit is assigned its own hardware-related media-access control (MAC) address. In the case of a radio unit incorporating the DECT protocol, for example, this MAC address may be related to the unit's unique DECT identity. When a radio unit registers with a base station 12, as described above with reference to FIG. 7, the unit's MAC address is stored by the base station 12 in a MAC address table, at the same time that the unit's mobile identifier is stored in the registration table. The base station's own MAC address is also included, permanently, in this MAC address table.

Every data packet appearing on the LAN 40 has a header containing, amongst other information, the MAC address of the intended destination for that packet. Each packet's header is checked by the LAN interface 28 in each base station 12 to ascertain whether that packet is destined for any of the radio units whose MAC addresses currently appear in the MAC address table maintained by that base station. To avoid imposing an excessive processing burden on the microprocessor 60 in the base station, this MAC address check may be performed by hardware circuitry dedicated to that task. If the MAC address in a packet's header matches one of the MAC addresses in the table, the packet is accepted by the LAN interface 28, and if the MAC address is that of a radio unit registered with the base station, the data in the LAN packet are transferred with an identifier over the links 38 to the radio interface 20, to be forwarded to the appropriate radio unit.

If a radio unit moves in such a way that it becomes registered with a different base station during a LAN communication operation, one or more LAN packets passing to or from that radio unit may fail to reach their destination during the changeover to the new base station. In this case the normal procedures which are implemented in LAN software for re-sending lost or corrupted packets may be expected to remedy this failure.

LAN packets generated by a radio unit are received by the radio interface 20 in the base station 12 with which the unit is currently registered, where they are transferred via the links 38 to the LAN interface 28, to be transmitted over the LAN 40. It will be apparent to a person skilled in the art that the base stations 12 provide LAN access to the radio units by operating in effect as LAN bridges.

The system 10 described above has several practical advantages. It provides a distributed, self-managed mobile communications system, in which there is no need for a costly, centralized control and management device of the kind which is commonly used in conventional mobile communications systems. In the implementation described maximum use is made of infrastructure and facilities which are provided by existing installations: all features of the PABX 44, such as switching and call forwarding, are directly available to the handsets 14. The system 10 can be implemented in an incremental manner, without requiring any major initial capital investment in new, centralized equipment. Thus individual users can purchase base stations 12 and associated handsets 14, at first for independent use as stand-alone cordless telephones with an existing PABX 44. When a sufficient number of base stations are present in an organization to constitute a worthwhile system, the base stations 12 can communicate with one another over a LAN 40, which may already be installed for use with personal computer systems. As soon as this connection is made, the base stations 12 automatically cooperate to provide the distributed system 10 without further investment or action by the users. To assist this incremental installation, the base stations 12 may be sold with only some of the interfaces installed (e.g. the radio interface 20 and the telephone interface 24); the remaining interfaces (e.g. the LAN interface 28 and the serial interface 32) may be added as subsequent purchases as and when required.

Various modifications can be made to the system described above. The radio protocol for use by the radio interface 20 and the radio units need not be the DECT protocol; other protocols such as CT2 or GSM can be used, alone or in combination in the same system. Other communications technology, such as infra-red, can be used instead of or in addition to radio to provide wireless connections. As noted earlier, it is possible for a base station to be home base station for more than one radio unit, and in particular more than one handset 14, by providing it with multiple telephone interfaces 24. However, it may be preferred to limit each base station to being home base station for only one (voice) handset, to simplify practical implementation. As also noted above, communications between two handsets both located in the service area of the same base station may be routed solely through that base station instead of via the home base station(s) of the handsets. However, this option requires duplication in the base stations of functions (in particular switching) which are inherent in the PABX 44, and significantly increases the complexity of the base stations.

We claim:

1. A base station for a telecommunications system, comprising:

- a wireless interface;
- a LAN interface;
- a third interface;
- a switching arrangement for selectively interconnecting said interfaces for transfer of signals therebetween in any of the following configurations:

a) said wireless interface is connected for transfer of signals directly to and from said third interface;

b) said wireless interface is connected for transfer of signals directly to and from said LAN interface;

c) said LAN interface is connected for transfer of signals directly to and from said third interface, said switching arrangement also converting signals between respective forms appropriate for each interface in accordance with prevailing selection of the interfaces for interconnection;

a store containing information indicating a specific association between said base station and a selected communication device, signals transferred between said selected device and said base station being transferable both via said wireless interface and via said LAN interface together with signals transferred between said base station and other devices; and a comparator for comparing said information in said store with association information for signals traversing said wireless interface and said LAN interface, and for recognizing a device associated with such signals as being said selected device having a specific association with said base station;

said switching arrangement selecting signals traversing either one of said wireless interface and said LAN interface and associated with said recognized selected device, and causing only such selected signals to be transferred to said third interface.

2. The base station according to claim 1, wherein the third interface is any of a public switched telephone network interface, a serial communications interface or an integrated services digital network interface.

3. The base station according to claim 1, wherein said information indicating a specific association between said base station and said selected device includes an address identifying said base station on a network coupled to said LAN interface.

4. The base station according to claim 1, wherein said third interface is a public switched telephone interface and said wireless interface is arranged to support wireless communication with a wireless handset comprising said selected communication device.

5. A method of operating a telecommunications system base station, comprising:

a wireless interface;

a LAN interface;

a third interface;

a switching arrangement for selectively interconnecting said interfaces for transfer of signals therebetween in any of the following configurations:

a) said wireless interface is connected for transfer of signals directly to and from said third interface;

b) said wireless interface is connected for transfer of signals directly to and from said LAN interface;

c) said LAN interface is connected for transfer of signals directly to and from said third interface, said switching arrangement also converting signals between respective forms appropriate for each interface in accordance with prevailing selection of the interfaces for interconnection;

said method comprising the steps of:

storing information indicating a specific association between said base station and a selected communication device, signals transferred between said selected device and said base station being transferable both via said wireless interface and via said LAN interface together with signals transferred between said base station and other devices; and comparing said information in said store with association information for signals traversing said wireless interface and said LAN interface, and recognizing a device associated with such signals as being said selected device having a specific association with said base station;

controlling said switching arrangement to select signals traversing either one of said wireless interface and said LAN interface and associated with said recognized selected device, and to cause only such selected signals to be transferred to said third interface.

* * * * *